US012401959B2

(12) United States Patent
Ueda

(10) Patent No.: US 12,401,959 B2
(45) Date of Patent: Aug. 26, 2025

(54) ABNORMAL SOUND DIAGNOSIS SYSTEM

(71) Applicant: TOYOTA JIDOSHA KABUSHIKI KAISHA, Toyota Aichi-ken (JP)

(72) Inventor: Yu Ueda, Toyota Aichi-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 283 days.

(21) Appl. No.: 18/095,232

(22) Filed: Jan. 10, 2023

(65) Prior Publication Data

US 2023/0239639 A1 Jul. 27, 2023

(30) Foreign Application Priority Data

Jan. 25, 2022 (JP) ................................ 2022-009210
Aug. 5, 2022 (JP) ................................ 2022-125180

(51) Int. Cl.
*H04R 29/00* (2006.01)
*G07C 5/08* (2006.01)
*G10L 25/18* (2013.01)

(52) U.S. Cl.
CPC ......... *H04R 29/008* (2013.01); *G07C 5/0808* (2013.01); *G10L 25/18* (2013.01)

(58) Field of Classification Search
None
See application file for complete search history.

(56) References Cited

U.S. PATENT DOCUMENTS

2007/0032968 A1 2/2007 Nakamura
2016/0048811 A1 2/2016 Asai
2017/0185501 A1* 6/2017 Mitsuhashi ........... G06F 16/634
2021/0311670 A1* 10/2021 Lu ...................... H04N 1/00029
2023/0030911 A1* 2/2023 Chen ...................... G01H 17/00

(Continued)

FOREIGN PATENT DOCUMENTS

JP 2005098984 A 4/2005
JP 2014191790 A 10/2014

OTHER PUBLICATIONS

Foreign priority document for Usami (Year: 2021).*

(Continued)

*Primary Examiner* — James K Mooney
(74) *Attorney, Agent, or Firm* — Dinsmore & Shohl LLP

(57) ABSTRACT

An abnormal sound diagnosis system includes a sound acquisition unit configured to acquire data of a sound generated from an object, an inquiry information acquisition unit configured to acquire inquiry information regarding an abnormal sound generated in the object, an arithmetic processing unit configured to acquire a spectrogram indicating a relationship among a time, a frequency, and sound pressure from the data of the sound, an extraction unit configured to acquire, based on the inquiry information acquired by the inquiry information acquisition unit, an inferred frequency range of the abnormal sound generated in the object and extract an extracted range corresponding the inferred frequency range of the spectrogram acquired by the arithmetic processing unit, and a diagnosis unit configured to diagnose, based on the extracted range of the spectrogram extracted by the extraction unit, a cause of the abnormal sound generated in the object.

18 Claims, 11 Drawing Sheets

(56) References Cited

U.S. PATENT DOCUMENTS

2023/0186690 A1* 6/2023 Usami .................... G07C 5/006
701/29.1

OTHER PUBLICATIONS

Sailor et al., "Unsupervised Filterbank Learning Using Convolutional Restricted Boltzmann Machine for Environmental Sound Classification", INTERSPEECH 2017, Aug. 20-24, 2017, 3107-3111, Speech Research Lab, Dhirubhai Ambani Institute of Information and Communication Technology (DA-IICT), Gandhinagar, India.

Tokozume et al., "Learning From Between-Class Examples for Deep Sound Recognition", Conference paper at ICLR 2018, Feb. 28, 2018, Vancouver, Canada.

Tak et al., "Novel Phase Encoded Mel Filterbank Energies for Environmental Sound Classification", PREMI 2017, 2017, LNCS 10597, pp. 317-325, Speech Research Lab, Dhirubhai Ambani Institute of Information and Communication Technology (DA-IICT), Gandhinagar, India.

Kumar et al., "Knowledge Transfer From Weakly Labeled Audio Using Convolutional Neural Network for Sound Events and Scenes" 2018, vol. 8, Carnegie Mellon University, Pittsburgh, USA.

Agrawal et al., "Novel TEO-based Gammatone Features for Environmental Sound Classification", 2017 25th European Signal Processing Conference (EUSIPCO), 2017, 1859-1863, Dhirubhai Ambani Institute of Information and Communication Technology (DA-IICT), Gandhinagar, India.

* cited by examiner

FIG. 6

| ONOMATOPOEIA | FREQUENCY RANGE | CHARACTERISTIC | SIMILAR SOUND |
|---|---|---|---|
| GATAGATA | 1 TO 5 kHz | INTERMITTENT SOUND | KATAKATA |
| KATAKATA | 1 TO 5 kHz | INTERMITTENT SOUND | GATAGATA |
| GARAGARA | 0.5 TO 3 kHz | INTERMITTENT SOUND | KARAKARA |
| KARAKARA | 0.5 TO 3 kHz | INTERMITTENT SOUND | GARAGARA |
| KACHING | 0 TO 10 kHz | WIDE AREA FREQUENCY | - |
| KEE | 10 kHz OR HIGHER | SINGLE FREQUENCY | KEENG |
| KEENG | 5 kHz OR HIGHER | SINGLE FREQUENCY | KEE |
| ⋮ | ⋮ | ⋮ | ⋮ |

| DRIVING STATE OF INQUIRY INFORMATION | PHYSICAL QUANTITY OF VEHICLE STATE INFORMATION |
|---|---|
| BRAKING (BRAKE ON) | ON/OFF TIME OF BRAKE LAMP SW |
| DECELERATING (BRAKE OFF) | ACCELERATING (MINUS) |
| TURNING | STEERING ANGLE |
| ⋮ | ⋮ |

FIG. 12

| ONOMATOPOEIA | GENERATION PLACE | FREQUENCY RANGE | CHARACTERISTIC | SIMILAR SOUND |
|---|---|---|---|---|
| GATAGATA | COMMON | 1 TO 5 kHz | INTERMITTENT SOUND | KATAKATA |
| KATAKATA | VEHICLE BODY | 1 TO 5 kHz | INTERMITTENT SOUND | KATAKATA |
| KATAKATA | ENGINE | 0.5 TO 4 kHz | INTERMITTENT SOUND | GATAGATA |
| KATAKATA | NOT SELECTED | 0.5 TO 5 kHz | INTERMITTENT SOUND | KARAKARA |
| GARAGARA | COMMON | 0.5 TO 3 kHz | INTERMITTENT SOUND | KARAKARA |
| KARAKARA | VEHICLE BODY | 1 TO 4 kHz | INTERMITTENT SOUND | GARAGARA |
| KARAKARA | ENGINE | 0.5 TO 3 kHz | INTERMITTENT SOUND | GARAGARA |
| KARAKARA | NOT SELECTED | 0.5 TO 4 kHz | INTERMITTENT SOUND | GARAGARA |
| KACHING | COMMON | 0 TO 10 kHz | WIDE AREA FREQUENCY | - |
| KEE | COMMON | 10 kHz OR HIGHER | SINGLE FREQUENCY | KEENG |
| KEENG | COMMON | 5 kHz OR HIGHER | SINGLE FREQUENCY | KEE |
| ⋮ | ⋮ | ⋮ | ⋮ | ⋮ |

ABNORMAL SOUND DIAGNOSIS SYSTEM

CROSS-REFERENCE TO RELATED APPLICATIONS

This application claims priority to Japanese Patent Application No. 2022-009210, filed on Jan. 25, 2022 and Japanese Patent Application No. 2022-125180, filed on Aug. 5, 2022, each incorporated herein by reference in its entirety.

BACKGROUND

1. Technical Field

The present disclosure relates to an abnormal sound diagnosis system configured to diagnose an abnormal sound generated in an object.

2. Description of Related Art

A sound and vibration analysis apparatus is known which, at the time of an operation of a power transmission mechanism of a vehicle having a plurality of rotating bodies, captures and analyzes data of the sound or the vibration that is generated according to rotation of a rotating body and data of rotational speed of a selected rotating body (see, for example, Japanese Unexamined Patent Application Publication No. 2005-98984 (JP 2005-98984 A)). The sound and vibration analysis apparatus frequency-analyzes the data of the sound or the vibration, and calculates an order according to a specification of the rotating body from the frequency-analyzed data of the sound or the vibration. Further, the sound and vibration analysis apparatus causes a display unit to display a sound pressure level calculated from the data of the sound or the vibration corresponding to the order and a vehicle speed, and plays a sound having the specific order selected by a worker on the display unit.

Further, an inquiry apparatus is known which executes a diagnosis for acquiring information regarding a defect symptom occurring in a vehicle to be diagnosed, and infers a cause of the defect symptom by itself based on the acquired information or outputs the acquired information to the outside (see, for example, Japanese Unexamined Patent Application Publication No. 2014-191790 (JP 2014-191790 A)). The inquiry apparatus includes a display unit that displays questions for acquiring the information regarding the defect symptom, a sample abnormal sound output unit that outputs a sample abnormal sound corresponding to the defect symptom, a control unit that controls the display of the display unit and the output sound of the sample abnormal sound output unit and processes an operation input by a user, and a storage unit that stores display data, which is data regarding the display of the display unit and sample abnormal sound data, which is data where a vehicle sound generated corresponding to each defect symptom is collected. The control unit of the inquiry apparatus causes the display unit to display a plurality of situation selection buttons, which are selection buttons used for requesting selection of a driving operation situation in which the defect symptom has occurred, and a plurality of symptom selection buttons, which are selection buttons used for requesting selection of the content of the defect symptom associated with the selection result of the situation selection buttons. Further, when the content of the defect symptom is on generation of an abnormal sound in the vehicle to be diagnosed, the control unit causes the display unit to display sample abnormal sound output buttons that output sample abnormal sounds corresponding to the defect symptom, together with the symptom selection buttons. As such, when the content of the defect symptom is on the generation of the abnormal sound, the corresponding sample abnormal sound can be output as an index used for selecting the symptom, and a customer or the like who has heard an actual abnormal sound can select the content of the symptom of the generation of the abnormal sound, which are difficult to be expressed, by comparing the actual abnormal sound with a plurality of sample abnormal sounds, and respond to the inquiry.

SUMMARY

According to the sound and vibration analysis apparatus described in JP 2005-98984 A, it is easy to secure matching with a sensory test by a graph display using the vehicle speed, and thus it may be possible to identify the rotating body that is a source of the sound by examining the order in which the sound is generated or by playing the captured sound. However, it is not easy for an inexperienced worker to specify the rotating body that is the source of the sound using the sound and vibration analysis apparatus, and a certain level of experience is required for the worker to accurately specify the rotating body that is the source of the sound while comparing the order or the vehicle speed with a sound pressure level. Further, as in the inquiry apparatus described in JP 2014-191790 A, even when the sample abnormal sound is output as a candidate, the customer or the like may not select a sample abnormal sound closest to the abnormal sound that has actually been generated. Then, when the customer or the like does not select a sound close to the actual abnormal sound, there is no choice but to diagnose the cause of the abnormal sound only from the inquiry information, such as the driving operation situation in which the defect symptom has occurred. Then, the accuracy of the diagnosis result may be worsened.

Therefore, the present disclosure provides an abnormal sound diagnosis system that enables even a worker with little experience in using an abnormal sound diagnosis system to easily obtain a highly accurate diagnosis result of an abnormal sound generated in an object.

An abnormal sound diagnosis system according to a first aspect of the present disclosure is configured to diagnose an abnormal sound generated in an object. The abnormal sound diagnosis system includes a sound acquisition unit configured to acquire data of a sound generated from the object, an inquiry information acquisition unit configured to acquire inquiry information regarding the abnormal sound generated in the object, an arithmetic processing unit configured to acquire a spectrogram indicating a relationship among a time, a frequency, and sound pressure from the data of the sound, an extraction unit configured to acquire, based on the inquiry information acquired by the inquiry information acquisition unit, an inferred frequency range of the abnormal sound generated in the object and extract an extracted range corresponding the inferred frequency range of the spectrogram acquired by the arithmetic processing unit, and a diagnosis unit configured to diagnose, based on the extracted range of the spectrogram extracted by the extraction unit, a cause of the abnormal sound generated in the object. The diagnosis unit of the abnormal sound diagnosis system may be constructed by machine learning.

In the first aspect, the abnormal sound diagnosis system may further include a storage device that stores an onomatopoeia in association with a frequency range for each of abnormal sounds generated in the object. The inquiry information may include information on the onomatopoeia similar to the abnormal sound generated in the object. The extraction unit may acquire, as the inferred frequency range, the frequency range corresponding to the onomatopoeia in the inquiry information from information stored in the storage device.

In the first aspect, the inquiry information may include a generation place of the abnormal sound. The storage device may store at least one of onomatopoeias in association with a plurality of generation places in association with the frequency range of the abnormal sound in each of the generation places. The extraction unit may acquire, as the inferred frequency range, the frequency range corresponding to the onomatopoeia and the generation place in the inquiry information from the information stored in the storage device.

In the first aspect, the abnormal sound diagnosis system may further include a display unit configured to display the extracted range extracted by the extraction unit. A selection may be allowed to a user about a desired range of the spectrogram displayed on the display unit.

In the first aspect, the diagnosis unit may diagnose the cause of the abnormal sound based on the data of the sound acquired by the sound acquisition unit, the inquiry information acquired by the inquiry information acquisition unit, and the inferred frequency range or a selected range. The selected range may be a range selected by the user from the extracted range displayed on the display unit.

In the first aspect, the diagnosis unit may be constructed by supervised learning such that the diagnosis unit diagnoses the cause of the abnormal sound based on given information.

An abnormal sound diagnosis system according to a second aspect of the present disclosure is configured to diagnose an abnormal sound generated in an object. The abnormal sound diagnosis system includes a sound acquisition unit configured to acquire data of a sound generated from the object, an inquiry information acquisition unit configured to acquire inquiry information on the abnormal sound generated in the object, an arithmetic processing unit configured to acquire a relationship between a time and sound pressure from the data of the sound, an extraction unit configured to acquire, based on the inquiry information acquired by the inquiry information acquisition unit, a generation time period in which the abnormal sound is generated in the object and extract an extracted range corresponding to the generation time period of the relationship between the time and the sound pressure acquired by the arithmetic processing unit, and a diagnosis unit configured to diagnose, based on the extracted range of the relationship between the time and the sound pressure, extracted by the extraction unit, a cause of the abnormal sound generated in the object. The diagnosis unit of the abnormal sound diagnosis system may also be constructed by machine learning.

In the second aspect, the abnormal sound diagnosis system may further include a state acquisition unit configured to acquire a state of the object in synchronization with acquiring the data of the sound by the sound acquisition unit. The inquiry information may include information on the state of the object when the abnormal sound is generated. The extraction unit may acquire, as the generation time period, a time period in which the state of the object acquired by the state acquisition unit matches the state of the object in the inquiry information among an acquisition time range of the data of the sound.

In the second aspect, the arithmetic processing unit may acquire a spectrogram indicating a relationship among a time, a frequency, and sound pressure from the data of the sound. The extraction unit may extract a frequency where the sound pressure is changed by a value equal to or higher than a predetermined value between a first time period and a second time period. The first time period may be a time period in which the state of the object that is acquired by the state acquisition unit matches the state of the object in the inquiry information. The second time period may be a time period in which the state of the object that is acquired by the state acquisition unit does not match the state of the object in the inquiry information.

In the second aspect, the object may be a vehicle. The state of the object may include at least one of a driving state of the vehicle and a physical quantity changed when the vehicle travels.

In the second aspect, the abnormal sound diagnosis system may further include a display unit configured to display the extracted range extracted by the extraction unit. A selection may be allowed to a user about a desired range of the relationship between the time and the sound pressure displayed on the display unit.

In the second aspect, the diagnosis unit may diagnose the cause of the abnormal sound based on the data of the sound acquired by the sound acquisition unit, the inquiry information acquired by the inquiry information acquisition unit, and the generation time period or a time range. The time range may be a range selected by the user from the extracted range displayed on the display unit.

In the second aspect, the diagnosis unit may be constructed by supervised learning such that the diagnosis unit diagnoses the cause of the abnormal sound based on given information.

An abnormal sound diagnosis system according to a third aspect of the present disclosure includes a mobile terminal and an information processing device. The mobile terminal is configured to acquire data of a sound generated from an object, acquire inquiry information on an abnormal sound generated in the object, acquire a spectrogram indicating a relationship among a time, a frequency, and sound pressure from the data of the sound, acquire, based on the inquiry information, an inferred frequency range of the abnormal sound generated in the object, and extract an extracted range corresponding the inferred frequency range of the spectrogram. The information processing device is configured to diagnose, based on the extracted range of the spectrogram, a cause of the abnormal sound generated in the object.

In the third aspect, the information processing device may include a storage device that stores an onomatopoeia in association with a frequency range for each of abnormal sounds generated in the object. The inquiry information may include information on the onomatopoeia similar to the abnormal sound generated in the object. The mobile terminal may acquire, as the inferred frequency range, the frequency range corresponding to the onomatopoeia in the inquiry information from information stored in the storage device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a descriptive diagram illustrating an example of a table used in the abnormal sound diagnosis system of the present disclosure;

FIG. 12 is a descriptive diagram illustrating another example of the table used in the abnormal sound diagnosis system of the present disclosure.

DETAILED DESCRIPTION

Next, embodiments for executing the present disclosure will be described with reference to the drawings.

Figure 1:
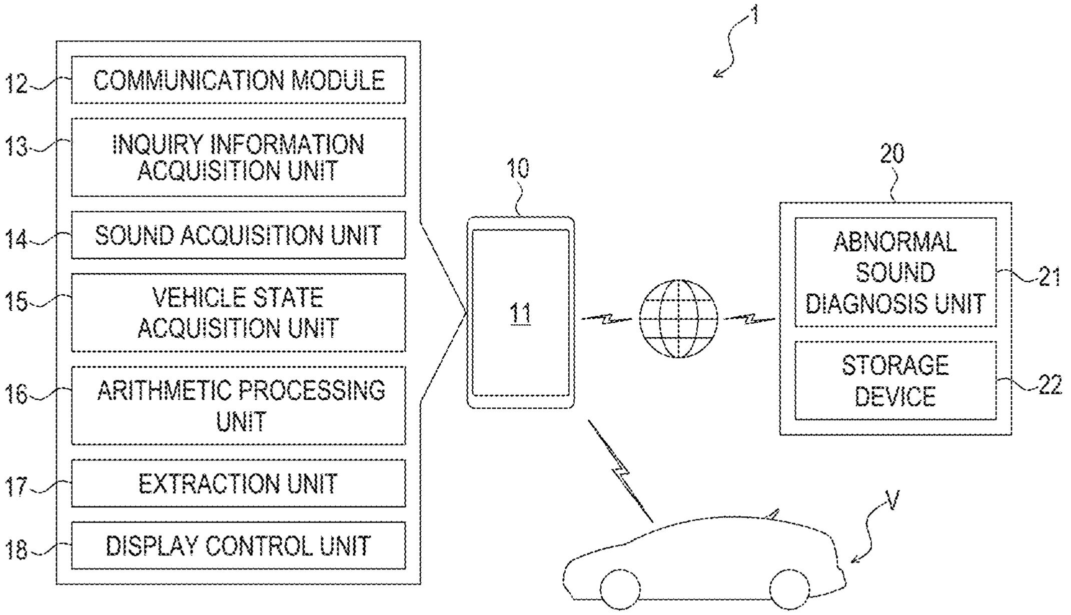
FIG. 1 is a schematic configuration diagram illustrating an abnormal sound diagnosis system of the present disclosure.

FIG. 1 is a schematic configuration diagram illustrating an abnormal sound diagnosis system 1 of the present disclosure. The abnormal sound diagnosis system 1 illustrated in FIG. 1 is a system used for diagnosing a cause of an abnormal sound generated in a vehicle V as an object, such as a vehicle having only an engine as a power generation source mounted thereon, a hybrid electric vehicle, a battery electric vehicle (including a fuel cell electric vehicle), and includes a mobile terminal 10 and a server 20 capable of exchanging information with the mobile terminal 10 via communication.

The mobile terminal 10 is used by a worker (a user of the abnormal sound diagnosis system 1) at a vehicle dealership, a maintenance shop, or the like when he/she responds to an owner or the like (a user of the vehicle V) of the vehicle V in which the abnormal sound is generated, or executes a reproduction test for reproducing the abnormal sound by causing the vehicle V to travel (operate) on a road or on a test bench. In the present embodiment, the mobile terminal 10 is a smart phone including, for example, a SoC including a CPU or a GPU, a ROM, a RAM, a secondary storage device (a flash memory) M, a display unit 11, a communication module 12, and a microphone (not shown). An abnormal sound diagnosis assistance application (a program) is installed in the mobile terminal 10. Then, as illustrated in FIG. 1, the mobile terminal 10 is constructed by cooperation of each of the abnormal sound diagnosis assistance application (software), the display unit 11, the communication module 12, and hardware, such as the SoC, the ROM, the RAM, and the microphone, and includes an inquiry information acquisition unit 13, a sound acquisition unit 14, a vehicle state acquisition unit 15, an arithmetic processing unit 16, an extraction unit 17, and a display control unit 18.

The display unit 11 of the mobile terminal 10 includes, for example, a touch panel type liquid crystal panel, or an organic EL panel. The communication module 12 can exchange various pieces of information with an electronic control unit of the vehicle V via near-field wireless communication or a cable (a dongle), and various pieces of information with the server 20 via a network, such as the Internet. The inquiry information acquisition unit 13 is constructed by cooperation of, for example, the abnormal sound diagnosis assistance application, the display unit 11, the communication module 12, the SoC, the ROM, and the RAM, and acquires information (hereinafter, referred to as "inquiry information") indicating a state of the vehicle V at a time of generation of the abnormal sound, provided by an owner or the like of the vehicle V via the display unit 11 or the communication module 12. The inquiry information may be input to the mobile terminal 10 via the display unit 11 by a worker, such as a vehicle dealership, who has heard it from the owner or the like of the vehicle V. Further, the inquiry information may be input by the owner or the like of the vehicle V to, for example, a dedicated web page provided by the server 20 from, for example, his/her mobile terminal or personal computer. In this case, the mobile terminal 10 acquires the inquiry information from the server 20 via the communication module 12 in response to an operation by the worker.

Figure 2:
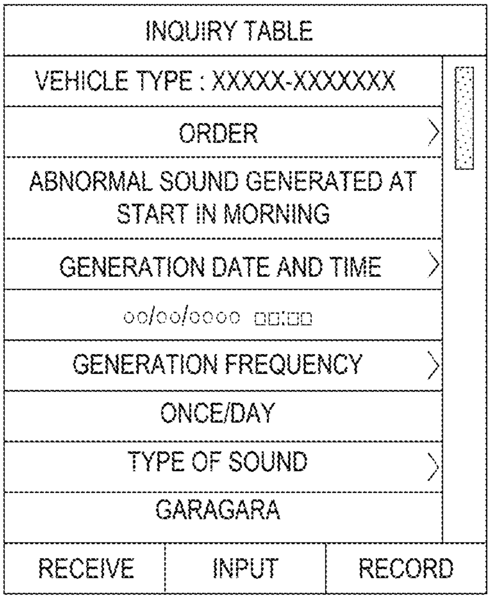
FIG. 2 is a descriptive diagram exemplifying an input screen of inquiry information.

FIG. 2 illustrates an input screen (an inquiry table) for inquiry information displayed on the display unit 11 of the mobile terminal 10 (or the above website) and an input example. As illustrated in a part of FIG. 2, the inquiry information includes, for example, vehicle type information, an order, generation date and time, generation frequency, a type of a sound, a physical quantity that is changed when the vehicle V travels, such as a vehicle speed, a driving state of the vehicle V, a warm-up effect in a vehicle having an engine mounted thereon, selection items selected by a driver while driving the vehicle V, and traveling environment information of the vehicle V. The vehicle type information is information for specifying the vehicle type of the vehicle V, such as a vehicle number or a vehicle identification number. The order is the detailed content of an abnormal sound generation state provided from the owner or the like of the vehicle V. The generation frequency is selected by the worker, the owner, or the like from a drop-down list (a list) prepared, in advance, including options, such as always, several times/day, once/day, several times/week, once/week, and once or less/month.

The type of a sound is selected by the worker, the owner, or the like from a drop-down list including a plurality of onomatopoeias (for example, gatagata, katakata, garagara, kaching, kee, and keeng), which corresponds to any of each of the abnormal sounds generated in the vehicle V and is recognized by the owner or the like of the vehicle V as similar to the abnormal sound actually generated. The physical quantity includes, for example, the vehicle speed, an engine speed, a motor speed, an ON/OFF time of a brake lamp switch, a steering angle, a SOC (for example, any one of fully charged, normal, or extremely low) of a high-voltage battery of the hybrid electric vehicle, or the battery electric vehicle. The physical quantity is heard from the owner or the like of the vehicle V by the worker, or is input by the owner or the like.

The driving state of the vehicle V is selected by the worker, the owner, or the like from a drop-down list including options such as starting, idling, stopping, starting, accelerating, constant speed traveling, decelerating (brake OFF), braking (brake ON), reversing, turning, motor traveling (driven by an engine (charging) present/absent) in a hybrid electric vehicle, and hybrid traveling (driven by an engine and a motor) in the hybrid electric vehicle. The warm-up effect is selected by the worker, the owner, or the like from a drop-down list including options, such as cold, warm, and cold and warm. The selection items are selected by the worker, the owner, or the like from a drop-down list including a shift position (for example, any one of P, R, N, D, B, and S (sports)), a traveling mode (for example, any one of normal, power, eco, snow, and comfort), and an operation state of an auxiliary machine (an on/off state of an air conditioner or a headlight). The traveling environment information is selected by the worker, the owner, or the like from a drop-down list including, for example, a road surface state, such as an uneven road, a rough road, a flat road, an uphill road, and a downhill road, or a weather condition, such as clear, cloudy, rainy, and snowy. It is needless to say that all of the plurality of items are not provided by the owner or the like of the vehicle V, and the inquiry information is provided within a range that can be understood by the owner or the like of the vehicle V.

The sound acquisition unit 14 is constructed by cooperation of the abnormal sound diagnosis assistance application and the SoC, the ROM, the RAM, the microphone, and the like, and acquires time-axis data of a sound (sound pressure) when a reproduction test is executed. The vehicle state acquisition unit 15 is constructed by cooperation of the abnormal sound diagnosis assistance application and the SoC, the ROM, the RAM, the display unit 11, the communication module 12, and the like, and acquires information (hereinafter, referred to as "vehicle state information") indicating the state of the vehicle V in synchronization with the acquisition of the time-axis data of the sound by the sound acquisition unit 14 when the reproduction test is executed. The vehicle state information includes a plurality of physical quantities (for example, the vehicle speed, the engine speed, the motor speed, the ON/OFF time of the brake lamp switch, the steering angle, the SOC of the high-voltage battery of the hybrid electric vehicle, or the battery electric vehicle) corresponding to the above-described items of the inquiry information. Further, the vehicle state information includes information calculated or detected by the electronic control unit, various sensors, or the like of the vehicle V and acquired via the communication module 12, and input from the display unit 11 by the worker or the like based on the inquiry information before the start of the reproduction test or the like. The arithmetic processing unit 16 is constructed by cooperation of the abnormal sound diagnosis assistance application, the SoC, the ROM, the RAM, and the like, and executes analysis processing of the time-axis data of the sound acquired by the sound acquisition unit 14. The extraction unit 17 is constructed by cooperation of the abnormal sound diagnosis assistance application and the SoC, the ROM, the RAM, and the like, and narrows down a result of the analysis processing of the arithmetic processing unit 16 based on the above-described inquiry information and the like. The display control unit 18 is constructed by cooperation of the abnormal sound diagnosis assistance application and the SoC, the ROM, the RAM, and the like, and controls the display unit 11.

The server 20 of the abnormal sound diagnosis system 1 is a computer (an information processing device) including, for example, a CPU, a ROM, a RAM, and an input/output device, and, in this embodiment, is installed and managed by, for example, an automobile manufacturer that manufactures the vehicle V. In the server 20, an abnormal sound diagnosis unit 21 that diagnoses the abnormal sound generated in the vehicle V is constructed by cooperation of hardware, such as a CPU, a ROM, or a RAM, and the abnormal sound diagnosis application (the program) installed in advance. The abnormal sound diagnosis unit 21 includes a neural network (a convolutional neural network) constructed by supervised learning (machine learning) such that the cause of the abnormal sound generated in the vehicle V or a part that is the source of the abnormal sound is diagnosed, based on the inquiry information acquired by the mobile terminal 10, the time-axis data of the sound, or the like. Teaching data used for constructing the abnormal sound diagnosis unit 21 includes, for example, the time-axis of the sound acquired for the time range including the timing when the abnormal sound is generated or the content (a value) of each item of the inquiry information for each of the abnormal sounds proven to be generated in the vehicle V. Further, in the server 20, when a new abnormal sound is proven to be generated in the vehicle V, re-learning of the abnormal sound diagnosis unit 21 is executed using the acquired time-axis data of the sound or the content of each item of the inquiry information for the new abnormal sound as the teaching data. As technologies for constructing the abnormal sound diagnosis unit 21, for example, technologies described in the following papers (1) to (5) or a combination thereof can be used.

(1) "CNN with filterbanks learned using convolutional RBM+fusion with GTSC and mel energies" and "CNN with filterbanks learned using convolutional RBM+ fusion with GTSC" described in "Unsupervised Filterbank Learning Using Convolutional Restricted Boltzmann Machine for Environmental Sound Classification"

(2) "EnvNet-v2 (tokozume2017a)+data augmentation+ Between-Class learning" and "EnvNet-v2 (tokozume2017a)+Between-Class learning" described in "LEARNING FROM BETWEEN-CLASS EXAMPLES FOR DEEP SOUND RECOGNITION"

(3) "CNN working with phase encoded mel filterbank energies (PEFBEs), fusion with Mel energies" described in Novel Phase Encoded Mel Filterbank Energies for Environmental Sound Classification"

(4) "CNN pretrained on Audio Set" described in "Knowledge Transfer from Weakly Labeled Audio using Convolutional Neural Network for Sound Events and Scenes", and (5) "Fusion of GTSC & TEO-GTSC with CNN" described in "Novel TEO-based Gammatone Features for Environmental Sound Classification"

Further, the server 20 includes a storage device 22 that stores a database storing information on the abnormal sounds proven to be generated in the vehicle V for each vehicle type. The database stores information, such as the time-axis data of the sound, the cause of the abnormal sound, the part that is the source of the sound, the content of the inquiry information provided from the owner or the like, and a measure for elimination of the abnormal sound, in association with each of the abnormal sounds. Further, the server 20 updates the database based on information acquired from a plurality of vehicles including the vehicle V or information on a newly proven abnormal sound sent from, for example, an automobile manufacturer (such as, a developer), a vehicle dealership, or a maintenance shop.

Subsequently, procedures for an abnormal sound diagnosis by the abnormal sound diagnosis system 1 will be described.

When the worker at the vehicle dealership or the maintenance shop is requested to eliminate the abnormal sound from the owner or the like of the vehicle V, he/she executes the reproduction test for acquiring information necessary for diagnosing the abnormal sound after listening to the inquiry information from the owner or the like, or for acquiring the inquiry information from the server 20. When executing the reproduction test, the worker (the user) activates the abnormal sound diagnosis assistance application of the mobile terminal 10 and taps a recording button displayed on the display unit 11. Further, the worker inputs necessary information from among the inquiry information provided from the owner or the like on the input screen displayed on the display unit 11, and connects the mobile terminal 10 to the electronic control unit of a target vehicle. As described above, the mobile terminal 10 and the electronic control unit of the target vehicle may be connected by the near-field wireless communication or may be connected via a cable (a dongle). Then, when the worker turns on a start switch (an IG switch) of the vehicle V, the mobile terminal 10 acquires vehicle information, such as the vehicle number or the vehicle identification number of the vehicle V from the electronic control unit. However, the vehicle information may be input to the mobile terminal 10 by the worker.

Further, the worker places or fixes the mobile terminal 10 at an appropriate place in a vehicle cabin. Further, when an external microphone is connected to the mobile terminal 10, the external microphone is installed in a place appropriate for sound recording, such as an engine room. Next, the worker taps a recording start button displayed on the display unit 11, causes the vehicle V to travel (operate) on the road or on the test stand, and reproduces a traveling state in which the abnormal sound is generated based on the inquiry information from the owner or the like of the vehicle V. While the vehicle V is traveling (operating), the sound acquisition unit 14 of the mobile terminal 10 acquires, at predetermined time intervals (very small time intervals), the time-axis data of the sound generated in the vehicle V, and the vehicle state acquisition unit 15 acquires, at predetermined time intervals (very small time intervals), the vehicle state information from the electronic control unit of the vehicle V in synchronization with the acquisition of time-axis data of the sound by the sound acquisition unit 14. The sound acquisition unit 14 and the vehicle state acquisition unit 15 acquire the time-axis data of the sound and the vehicle state information until the worker taps a sound recording stop button displayed on the display unit 11 in response to the stopping or the like of the vehicle V. When the acquisition of the time-axis data of the sound and the vehicle state information is completed, the arithmetic processing unit 16 and the extraction unit 17 of the mobile terminal 10 execute the analysis processing of the time-axis data of the sound.

Figure 3:
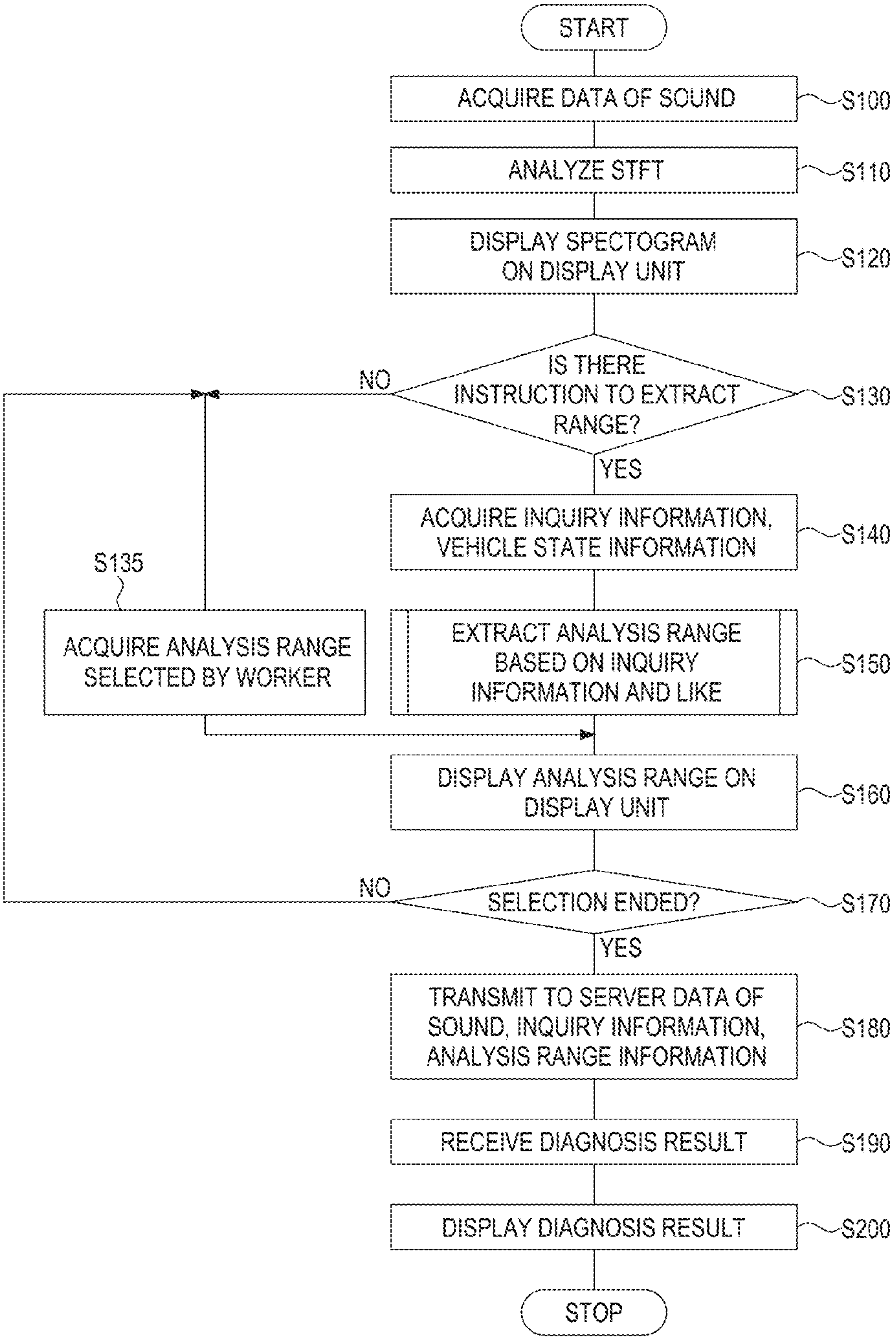
FIG. 3 is a flowchart illustrating a series of processes executed in a mobile terminal that composes the abnormal sound diagnosis system of the present disclosure.
Figure 4:
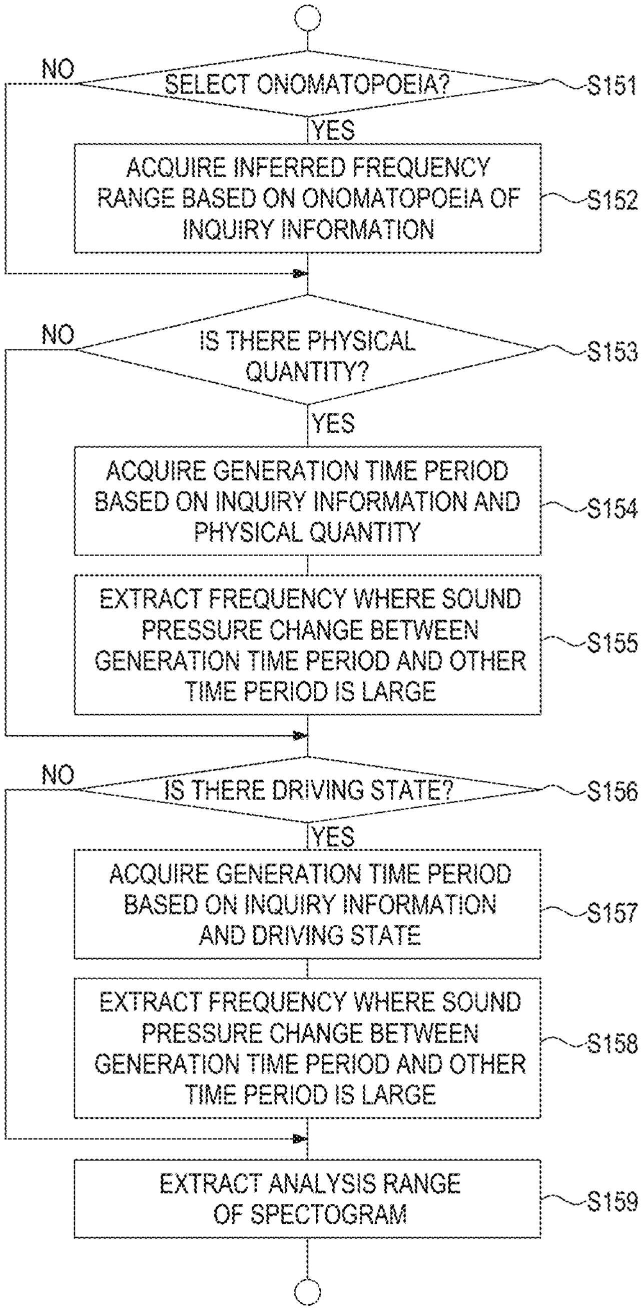
FIG. 4 is a flowchart for describing a process of step S150 of FIG. 3.

FIG. 3 is a flowchart illustrating a series of processes executed in the mobile terminal 10 at the time of diagnosing the abnormal sound, and FIG. 4 is a flowchart illustrating details of the process in step S150 of FIG. 3.

Figure 5:
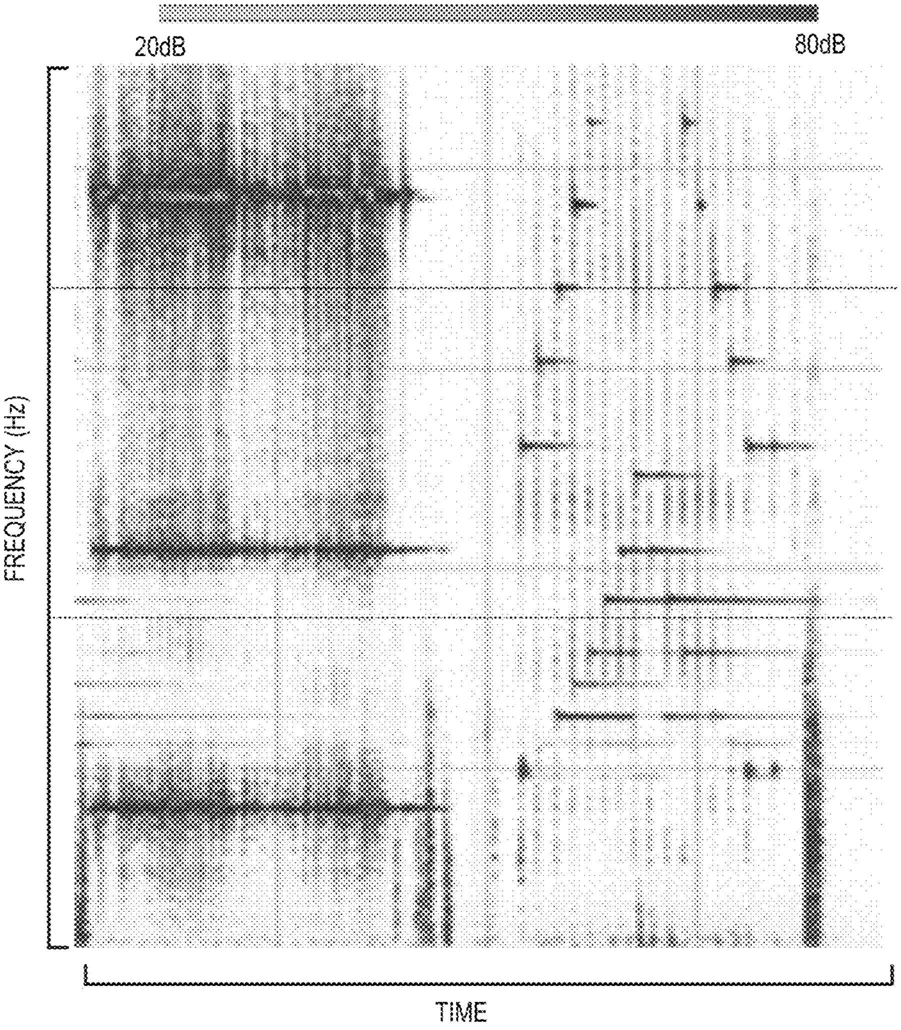
FIG. 5 is a descriptive diagram illustrating an example of a spectrogram displayed on a display screen of the mobile terminal that composes the abnormal sound diagnosis system of the present disclosure.

As illustrated in FIG. 3, the arithmetic processing unit 16 of the mobile terminal 10 acquires the time-axis data of the sound acquired by the sound acquisition unit 14 after an end of the reproduction test (step S100). Further, the arithmetic processing unit 16 executes the Short-Time Fourier Transform (STFT) on the acquired time-axis data of the sound, and acquires a spectrogram (an acoustic spectrogram) indicating a relationship between the time, the frequency, and the sound pressure (step S110). Further, as illustrated in FIG. 5, the display control unit 18 of the mobile terminal 10 causes the display unit 11 to display the spectrogram (a color map) acquired by the arithmetic processing unit 16 (step S120). In the embodiment, the spectrogram has the horizontal axis as a time axis and the vertical axis as a frequency axis indicates a relationship between the time and the sound pressure level for each frequency by color-coding the sound pressure level.

When the spectrogram is displayed on the display unit 11 of the mobile terminal 10, the worker taps a selection instruction button displayed on the display unit 11, and extracts (selects), onto the mobile terminal 10, a range (hereinafter, referred to as an "analysis range") of the spectrogram to be analyzed by the abnormal sound diagnosis unit 21 (the server 20) or selects (designates) the analysis range on the display unit 11 using his/her fingertip. When the worker instructs extraction of the analysis range on the mobile terminal 10 side (step S130: YES), the extraction unit 17 of the mobile terminal 10 acquires the inquiry information acquired by the inquiry information acquisition unit 13 and the vehicle state information acquired by the vehicle state acquisition unit 15 (step S140), and extracts the analysis range of the spectrogram based on at least one of the acquired inquiry information and vehicle state information (step S150).

In step S150, as illustrated in FIG. 4, the extraction unit 17 determines whether an onomatopoeia is selected in the inquiry information acquired in step S140 (step S151). Upon determining that an onomatopoeia is selected in the inquiry information (step S151: YES), the extraction unit 17 acquires the frequency range corresponding to the selected onomatopoeia as an inferred frequency range of the abnormal sound generated in the vehicle V (step S152). In the present embodiment, the extraction unit 17 derives the frequency range corresponding to the onomatopoeia included in the inquiry information from the table illustrated in FIG. 6 as the inferred frequency range. Further, when the extraction unit 17 determines that no onomatopoeia is selected in the inquiry information (step S151: NO), the process of step S152 is skipped.

The table of FIG. 6 is created in advance based on experiments and analysis results and stored in the secondary storage device M of the mobile terminal 10 such that each of the onomatopoeias that can be selected as the inquiry information is associated with the frequency range of the corresponding abnormal sound. Further, in the table of FIG. 6, each of the onomatopoeias is associated with a characteristic of the corresponding abnormal sound and an onomatopoeia of another abnormal sound that is similar to the corresponding abnormal sound. Further, in the present embodiment, the table of FIG. 6 is updated by the server 20 at a timing when the new abnormal sound is proven to be generated in the vehicle V or on a regular basis. In other words, the server 20 updates the table of FIG. 6 based on the information acquired from the vehicles including the vehicle V or the information that is on the new abnormal sound proven to be generated in the vehicle V and is sent from, for example, an automobile manufacturer (such as, a developer), a vehicle dealership, or a maintenance shop, and sends a notification indicating that the table has been updated to the mobile terminal 10. As such, at the time of diagnosing the abnormal sound, a worker of the vehicle dealership, the maintenance shop, or the like can download a latest table from the server 20 to the mobile terminal 10 and store it in the secondary storage device M.

After the process of step S151 or S152, the extraction unit 17 determines whether the inquiry information acquired in step S140 includes the physical quantity (for example, a specific numerical value), such as the vehicle speed or the engine speed indicating the state of the vehicle V when the abnormal sound is generated (step S153). Upon determining that the inquiry information includes the physical quantity (step S153: YES), the extraction unit 17 acquires, based on the physical quantity and the inquiry information that is acquired in step S140, a generation time period in which the abnormal sound is generated in the vehicle V (step S154).

Figure 7:
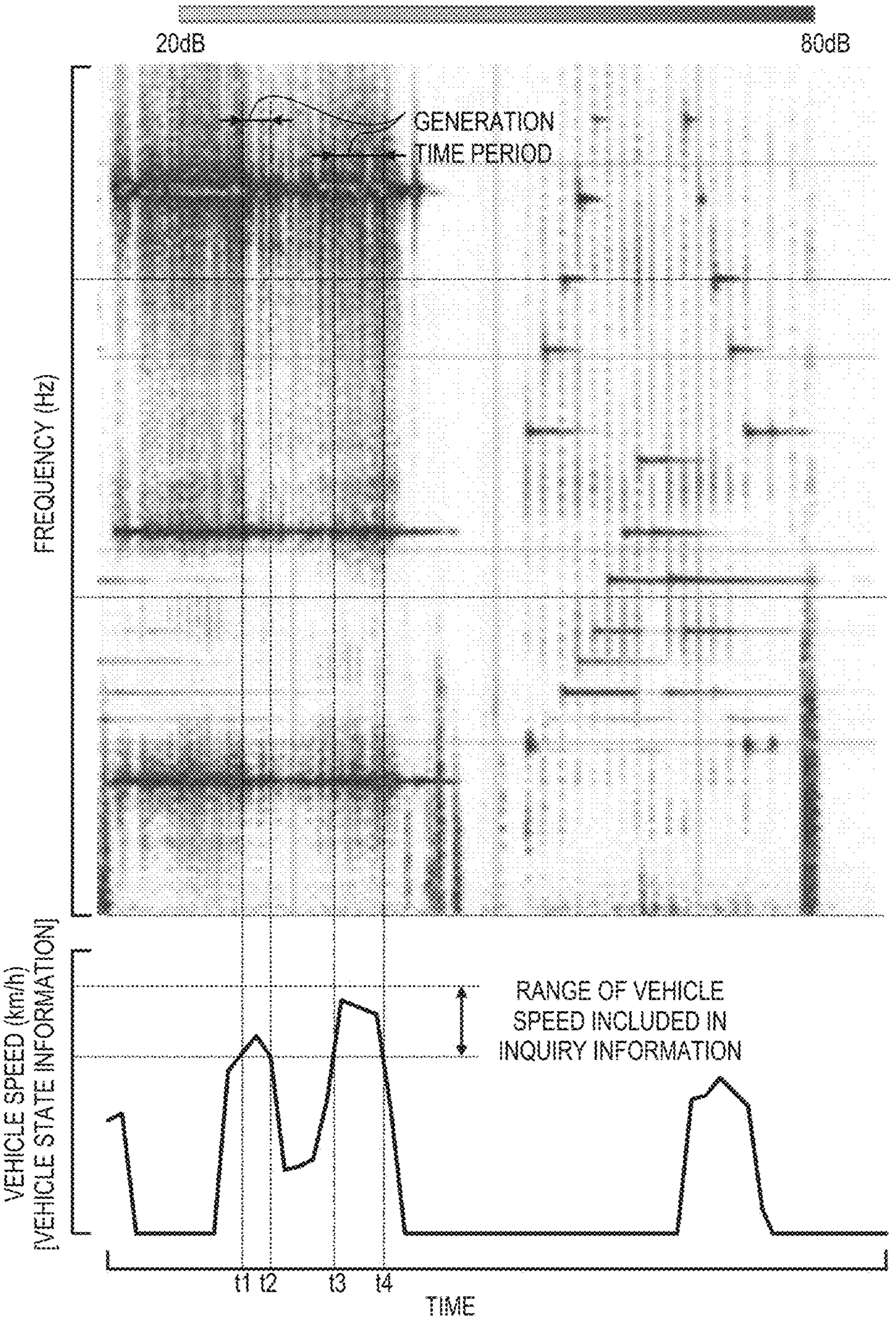
FIG. 7 is a descriptive diagram for describing procedures for acquiring a generation time period of an abnormal sound from inquiry information and vehicle state information.

In step S154, the extraction unit 17 acquires, as the generation time period, the time period in which the physical quantity of the vehicle state information matches the physical quantity included in the inquiry information, from the acquisition time range of the time-axis data of the sound. For example, when a range of the vehicle speed as the physical quantity included in the inquiry information and the vehicle speed (waveform) as the physical quantity included in the vehicle state information are as illustrated in FIG. 7, respectively, the vehicle speed of the vehicle state information in a time period from time t1 to time t2 and a time period from time t3 to time t4 is included in the range of the vehicle speed of the inquiry information, and the physical quantity of the vehicle state information in these time periods matches the physical quantity included in the inquiry information. In such a case, the extraction unit 17 acquires the time period from time t1 to time t2 and the time period from time t3 to time t4 as the generation time period.

Figures 8, 9:
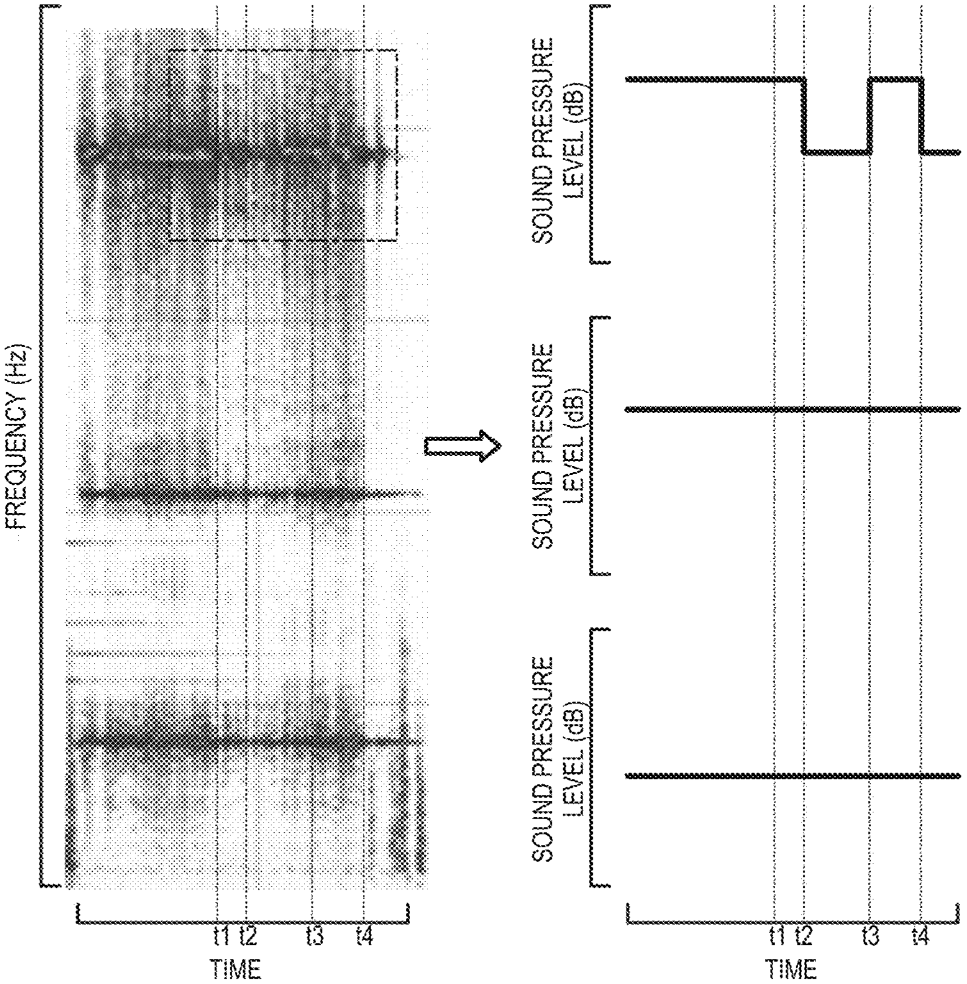
FIG. 8 is a descriptive diagram for describing procedures for extracting characteristic frequency from a relationship between time and sound pressure.
FIG. 9 is a descriptive diagram exemplifying another table used in the abnormal sound diagnosis system of the present disclosure.

Further, the extraction unit 17 extracts a characteristic frequency where the sound pressure is changed by a value equal to or higher than a threshold value (a predetermined value) determined in advance for each of a plurality of frequencies in the spectrogram, between the generation time period (the time period in which the physical quantity of the vehicle state information matches the physical quantity included in the inquiry information) acquired in step S154 and a time period in which the physical quantity of the vehicle state information does not match the physical quantity included in the inquiry information (step S155). For example, as illustrated in FIG. 8, when the time period from time t1 to time t2 and the time period from time t3 to time t4 are the generation time period, in step S155, the extraction unit 17 calculates, for each of the frequencies in the spectrogram, the difference between the average value of the sound pressure in the generation time period from time t1 to time t2 and the average value of the sound pressure in the time period from time t2 to time t3 in which the physical quantity of the vehicle state information does not match the physical quantity included in the inquiry information, and a difference between the average value of the sound pressure in the generation time period from time t3 to time t4 and the average value of the sound pressure in the time period from time t2 to time t3. Further, in step S155, the extraction unit 17 extracts a characteristic frequency (see a range represented by a dash-dot-dash line in FIG. 8) at which the difference between the average values of the sound pressure is equal to or higher than a threshold value for each of the frequencies in the spectrogram.

When the extraction unit 17 determines that the inquiry information does not include the physical quantity (for example, a specific numerical value) (step S153: NO), both steps S154 and S155 are skipped. Further, when there is no characteristic frequency where the difference in the average values of the sound pressure is equal to or higher than the threshold value, no characteristic frequency is extracted in step S155.

Further, after the process of step S153 or S155, the extraction unit 17 determines whether the inquiry information acquired in step S140 includes the driving state of the vehicle V when the abnormal sound is generated (step S156). Upon determining that the inquiry information includes the driving state (step S156: YES), the extraction unit 17 acquires, based on the driving state and the inquiry information that is acquired in step S140, the generation time period in which the abnormal sound is generated in the vehicle V (step S157).

Figure 10:
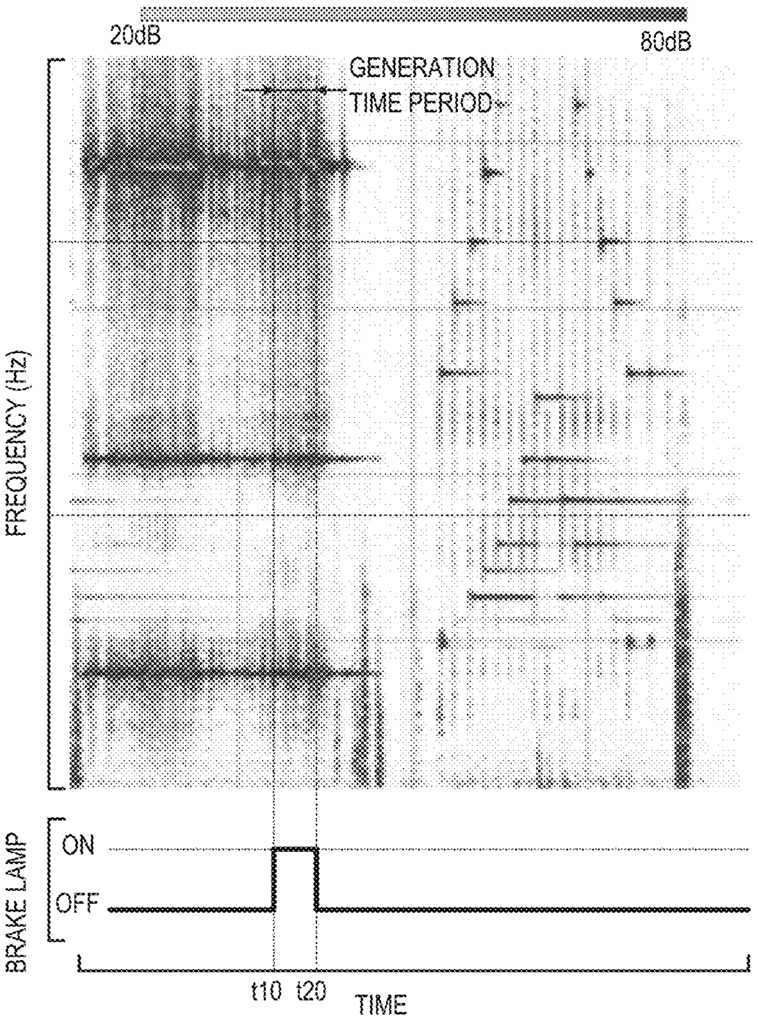
FIG. 10 is another descriptive diagram for describing procedures for acquiring the generation time period of the abnormal sound from the inquiry information and the vehicle state information.

In step S157, referring to a table illustrated in FIG. 9, the extraction unit 17 acquires the physical quantity of the vehicle state information corresponding to the driving state of the inquiry information, and acquires, as the generation time period, the time period in which the physical quantity acquired by referring to the above table is changed according to the driving state of the inquiry information, from among the acquisition time range of the time-axis data of the sound. The table of FIG. 9 is created in advance and stored in the secondary storage device M of the mobile terminal 10 such that the physical quantity indicating a change according to the driving state is associated with each of the driving states that can be selected as the inquiry information. For example, when the driving state included in the inquiry information is "braking", the extraction unit 17 refers to the table illustrated in FIG. 9, acquires the ON/OFF time of the brake lamp switch from the vehicle state information, and acquires, as the generation time period, a time period from the ON time (time t10 in FIG. 10) to the OFF time (time t20 in FIG. 10) of the brake lamp switch. In other words, the generation time period acquired in step S157 is a time period in which the state of the vehicle V at the time of the reproduction test matches the driving state included in the inquiry information.

Further, the extraction unit 17 extracts a characteristic frequency where the sound pressure is changed by a value equal to or higher than a threshold value (a predetermined value) determined in advance for each of the plurality of frequencies in the spectrogram, between the generation time period (the time period in which the physical quantity of the vehicle state information matches the physical quantity included in the inquiry information) acquired in step S157 and a time period in which the physical quantity of the vehicle state information does not match the physical quantity included in the inquiry information (step S158). The process of step S158 is executed by the same procedures as those of step S155 described above. Further, when the extraction unit 17 determines that the inquiry information does not include the driving state (step S156: NO), the processes of steps S157 and S158 are skipped. Further, when there is no characteristic frequency where the difference in the average values of the sound pressure is equal to or higher than the threshold value, no characteristic frequency is extracted in step S158.

After the process of step S156 or S158, the extraction unit 17 extracts the analysis range of the spectrogram acquired by the arithmetic processing unit 16 based on the inferred frequency range, the generation time period, and the characteristic frequency that are acquired or extracted in steps S152 to S158 (step S159). In other words, in step S159, the extraction unit 17 extracts, as the analysis range, at least any one of the range corresponding to the inferred frequency range of the spectrogram acquired in step S152, the range that corresponds to the generation time period of the spectrogram acquired in step S154 and includes the characteristic frequency extracted in step S155, and the range that corresponds to the generation time period of the spectrogram acquired in step S157 and includes the characteristic frequency extracted in step S158.

When the analysis range of the spectrogram is extracted in step S150 (steps S151 to S159), the display control unit 18 causes the display unit 11 to display, for example, only the analysis range extracted by the extraction unit 17 by graying out a part of the spectrogram displayed on the display unit 11 that has not been extracted by the extraction unit 17 (step S160). Further, when a plurality of analysis ranges is extracted by the extraction unit 17 in step S150 (step S159), the display control unit 18 causes the display unit 11 to display only one analysis range according to a constraint determined in advance and causes the display unit 11 to sequentially display the analysis ranges according to a swipe of the display unit 11 by the worker. Further, in the present embodiment, when the analysis range corresponding to the inferred frequency range that is acquired based on the onomatopoeia is extracted, the onomatopoeia, the frequency range, and the characteristic included in the table of FIG. 6 are displayed on the display unit 11 together with the analysis range. As such, it is possible to provide useful information to the worker.

The analysis range may not be extracted by the extraction unit 17 in step S150 depending on the content of the inquiry information and the vehicle state information. In this case, the display control unit 18 causes the display unit 11 to display a message, "The analysis range cannot be selected" and prompts the worker to select the analysis range. Further, instead of graying out the part that is not extracted by the extraction unit 17, the analysis range extracted by the extraction unit 17 may be enlarged and displayed on the display unit 11.

On the other hand, when the worker selects (designates) the analysis range of the spectrogram with his/her fingertip on the display unit 11 mainly based on a color-coded sound pressure level or the like (step S130: NO), the display control unit 18 acquires the analysis range selected by the worker (step S135) and causes the display unit 11 to display only the analysis range selected by the worker by graying out the part that is not selected by the worker (step S160). After causing the display unit 11 to display the analysis range, the display control unit 18 determines whether the worker has tapped a selection end button displayed on the display unit 11 (step S170). When it is determined that the worker has not tapped the selection end button (step S170: NO), the process of step S135 is executed again. In other words, when the worker has not tapped the selection end button, the worker can further narrow down the analysis range extracted by the extraction unit 17. For this reason, when it is determined that the worker has not tapped the selection end button (step S170: NO), the analysis range selected by the worker is confirmed again in step S135.

Then, when the worker taps the selection end button displayed on the display unit 11, the information necessary for diagnosing the abnormal sound is transmitted from the communication module 12 of the mobile terminal 10 to the server 20 (step S180). The information transmitted from the mobile terminal 10 to the server 20 in step S180 includes the time-axis data of the sound acquired by the sound acquisition unit 14, the inquiry information acquired by the inquiry information acquisition unit 13, and information defining a final analysis range displayed on the display unit 11. Further, the information defining the final analysis range includes at least one of the inferred frequency range, the generation time period, and the characteristic frequency that are acquired or extracted by the extraction unit 17 through the processes of steps S151 to S158, and the information defining the range selected by the worker from the analysis range extracted by the extraction unit 17, or the information defining the range selected by the worker.

When the information necessary for diagnosing the abnormal sound is transmitted from the mobile terminal 10 to the server 20, the abnormal sound diagnosis unit 21 of the server 20 diagnoses the cause of the abnormal sound generated in the vehicle V based on the information given from the mobile terminal 10 and transmits a diagnosis result to the mobile terminal 10. The diagnosis result includes, for example, the cause of the abnormal sound generated in the vehicle V, a part, such as the source of the abnormal sound, and a measure for elimination of the abnormal sound read from the storage device 22. Further, when the diagnosis result is received by the mobile terminal 10 from the server 20 (step S190), the diagnosis result is displayed on the display unit 11 (step S200), and, at the time of diagnosing the abnormal sound, a series of processes of FIG. 3 executed in the mobile terminal 10 ends. By executing the series of processes illustrated in FIG. 3, the worker can accurately describe the diagnosis results to the owner or the like of the vehicle V and promptly proceed with the measure for elimination of the abnormal sound.

As described above, the arithmetic processing unit 16 of the mobile terminal 10 composing the abnormal sound diagnosis system 1 acquires the spectrogram indicating the relationship between the time, the frequency, and the sound pressure from the time-axis data of the sound, which is generated from the vehicle V as the object, acquired by the sound acquisition unit 14 (steps S100 to S120), and the extraction unit 17 of the mobile terminal 10 acquires, based on, for example, the inquiry information acquired by the inquiry information acquisition unit 13, the inferred frequency range of the abnormal sound generated in the vehicle V (steps S150 and S152). Further, the extraction unit 17 extracts the analysis range corresponding to the inferred frequency range of the spectrogram (steps S150 and S159), and the abnormal sound diagnosis unit 21 of the server 20 diagnoses, based on the information indicating the analysis range extracted in step S159, the cause of the abnormal sound generated in the vehicle V (steps S180 to S190). Further, the extraction unit 17 of the mobile terminal 10 acquires, based on, for example, the inquiry information acquired by the inquiry information acquisition unit 13, the generation time period in which the abnormal sound is generated in the vehicle V (steps S150 and S154). Further, the extraction unit 17 extracts the analysis range corresponding to the generation time period of the spectrogram (the relationship between the time and the sound pressure) (steps S150 and S159), and the abnormal sound diagnosis unit 21 of the server 20 diagnoses, based on the information indicating the analysis range extracted in step S159, the cause of the abnormal sound generated in the vehicle V (steps S180 to S190).

As such, by selecting the range of the spectrogram to be analyzed by the abnormal sound diagnosis unit 21 on the mobile terminal 10 side (the system side) based on the inquiry information, it is possible to suitably ensure the accuracy of the diagnosis result of the cause of the abnormal sound. Further, the worker using the abnormal sound diagnosis system 1 does not have to select the range of the spectrogram to be analyzed by the abnormal sound diagnosis unit 21 by himself/herself. As a result, even a worker with little experience in using the abnormal sound diagnosis system 1 can easily obtain a highly accurate diagnosis result of the abnormal sound generated in the vehicle V.

Further, the mobile terminal 10 composing the abnormal sound diagnosis system 1 includes the secondary storage device M that stores the table of FIG. 6 in which the onomatopoeia is associated with the frequency range for each of the abnormal sounds generated in the vehicle V. Further, the inquiry information includes the onomatopoeia similar to the abnormal sound generated in the vehicle V. Further, the extraction unit 17 of the mobile terminal 10 acquires, as the inferred frequency range, the frequency range corresponding to the onomatopoeia included in the inquiry information from the table (the information) of FIG. 6 stored in the secondary storage device M (step S152). As such, by selecting the onomatopoeia close to the abnormal sound generated in the vehicle V, the worker of the abnormal sound diagnosis system 1 or the owner of the vehicle V can easily obtain a highly accurate diagnosis result of the abnormal sound.

Further, the mobile terminal 10 composing the abnormal sound diagnosis system 1 includes the vehicle state acquisition unit 15 that acquires, vehicle state information indicating the state of the vehicle V in synchronization with the acquisition of the time-axis data of the sound by the sound acquisition unit 14 when the reproduction test is executed. Further, the inquiry information includes, for example, the physical quantity indicating the state of the vehicle V when the abnormal sound is generated or the driving state of the vehicle V. Further, the extraction unit 17 acquires, as the generation time period, the time period in which the physical quantity (for example, the vehicle speed) of the vehicle state information acquired by the vehicle state acquisition unit 15 matches the physical quantity (for example, the range of the vehicle speed) included in the inquiry information, from the acquisition time range of the time-axis data of the sound (step S154). In addition, the extraction unit 17 acquires, as the generation time period, the time period in which the state of the vehicle V indicated by the vehicle state information (the physical quantity) acquired by the vehicle state acquisition unit 15 at the time of the reproduction test matches the driving state included in the inquiry information, from the acquisition time range of the time-axis data of the sound (step S157). As such, since the generation time period can be appropriately acquired, it is possible to further enhance the accuracy of the diagnosis result of the cause of the abnormal sound.

Further, the extraction unit 17 extracts the characteristic frequency where the sound pressure is changed by a value equal to or higher than the threshold value (the predetermined value) determined in advance between the generation time period in which the physical quantity of the vehicle state information matches the physical quantity included in the inquiry information and the time period in which the physical quantity of the vehicle state information does not match the physical quantity included in the inquiry information (steps S155 and S158). As such, it is possible to appropriately narrow down the frequency range of the spectrogram to be analyzed by the abnormal sound diagnosis unit 21 of the server 20 based on, for example, the inquiry information.

Further, the inquiry information and the vehicle state information in the abnormal sound diagnosis system 1 include, as the information indicating the state of the vehicle V, the physical quantity that is changed when the vehicle V travels and the driving state of the vehicle V. As such, it is possible to accurately diagnose the cause of the abnormal sound generated in the vehicle V. However, the inquiry information and the vehicle state information may include only one of the physical quantity that is changed when the vehicle V travels and the driving state of the vehicle V.

Further, the mobile terminal 10 composing the abnormal sound diagnosis system 1 includes the display unit 11 that displays the range corresponding to the inferred frequency range of the spectrogram extracted by the extraction unit 17 in step S159, and allows the worker to select a desired range of the spectrogram displayed on the display unit 11 (step S130: NO, step S135). As such, the worker who is the user of the abnormal sound diagnosis system 1 can confirm the extraction result by the extraction unit 17 from the spectrogram (the analysis range) displayed on the display unit 11 and further narrow down the analysis range. In addition, by confirming the extraction result by the extraction unit 17 and the diagnosis result by the abnormal sound diagnosis unit 21 of the server 20, a worker with little experience in using the abnormal sound diagnosis system 1 can understand a method of efficiently selecting the spectrogram on the display unit 11.

Further, the abnormal sound diagnosis unit 21 of the server 20 diagnoses the cause of the abnormal sound based on the time-axis data of the sound acquired by the sound acquisition unit 14, the inquiry information acquired by the inquiry information acquisition unit 13, at least one of the inferred frequency range, the generation time period, and the characteristic frequency that are acquired or extracted by the extraction unit 17 through the processes of steps S151 to S158, or the information defining the range selected by the worker from the analysis range extracted by the extraction unit 17. As such, it is possible to accurately diagnose the cause of the abnormal sound. In other words, giving the abnormal sound diagnosis unit 21 at least one of the inferred frequency range, the generation time period, and the characteristic frequency acquired or extracted by the extraction unit 17, or the information defining the final analysis range is extremely useful for enhancing the accuracy of diagnosing the abnormal sound. Therefore, by constructing the abnormal sound diagnosis unit 21 by the supervised learning such that the cause of the abnormal sound is diagnosed based on the given information, it is possible to further enhance the accuracy of diagnosing the abnormal sound.

Further, the abnormal sound diagnosis system 1 includes the mobile terminal 10 including the inquiry information acquisition unit 13, the sound acquisition unit 14, the vehicle state acquisition unit 15, the arithmetic processing unit 16, and the extraction unit 17, and the server 20 including the abnormal sound diagnosis unit 21 and exchanging, as the information processing device, information by communication with the mobile terminal 10. As such, it is possible to easily acquire the time-axis data of the sound generated from the vehicle V, and reduce a load on the mobile terminal 10 to obtain a highly accurate diagnosis result by the server 20.

The abnormal sound diagnosis assistance application (the program) installed in the mobile terminal 10 may be installed in a tablet terminal, a laptop-type personal computer, a desktop-type personal computer, or the like, or the tablet terminal or the like may be used instead of the mobile terminal 10. Further, when a desktop-type personal computer is used, data is transferred from a smartphone or the like to the personal computer after the time-axis data of the sound and the vehicle state information are acquired from the vehicle V using a smartphone or the like. Further, the abnormal sound diagnosis assistance application installed in the server 20 may be installed in the mobile terminal 10, a tablet terminal, a laptop-type personal computer, a desktop-type personal computer, or the like. In other words, the abnormal sound diagnosis system 1 may be composed of a single information processing device.

Further, the arithmetic processing unit 16 of the mobile terminal 10 acquires the spectrogram indicating the relationship between the time, the frequency, and the sound pressure from the time-axis data of the sound generated from the vehicle V acquired by the sound acquisition unit 14, but the present disclosure is not limited thereto. In other words, the arithmetic processing unit 16 may acquire the relationship between only the time and the sound pressure from the time-axis data of the sound. Further, the object of the abnormal sound diagnosis system 1 is not limited to the vehicle V. In other words, the abnormal sound diagnosis system 1 may be applied to the diagnosis of the abnormal sounds generated in a railway vehicle, a ship, an aircraft, an industrial machine, and the like.

Figure 11:
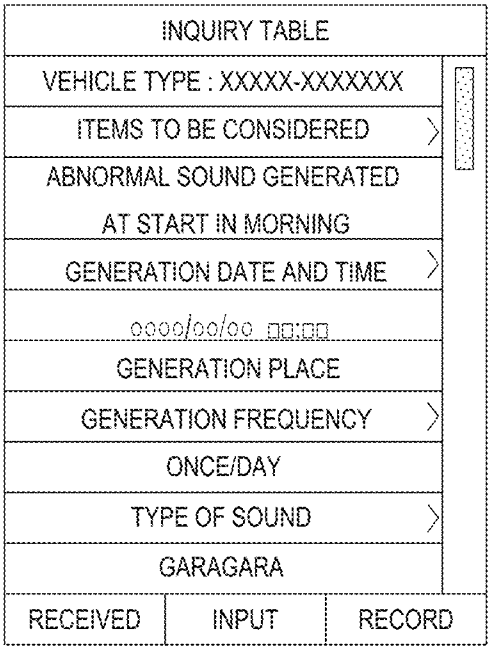
FIG. 11 is a descriptive diagram illustrating another example of the input screen of the inquiry information.

In the vehicle V, even when the frequency ranges are different, the onomatopoeias may be common among the plurality of abnormal sounds of which the generation places are different from each other in the vehicle V. Based on this, in the abnormal sound diagnosis system 1, the inquiry information input to the mobile terminal 10 may include the generation place of the abnormal sound in the vehicle V such that the worker, the owner, or the like can designate the generation place of the abnormal sound. In other words, as illustrated in FIG. 11, the input screen (the inquiry table) for the inquiry information displayed on the display unit 11 of the mobile terminal 10 (or the above website) may include an input column used for designating (selecting) the generation place of the abnormal sound. In this case, the generation place of the abnormal sound is selected by the worker, the owner, or the like from a drop-down list including a plurality of vehicle parts, such as the engine, a power train, a vehicle body, the brake, a door, and an interior.

FIG. 12 is a descriptive diagram illustrating a table that can be applied in step S152 of FIG. 3 when the inquiry information includes the generation place of the abnormal sound. The table illustrated in FIG. 12 is also created in advance and stored in the secondary storage device M of the mobile terminal 10 such that each of the onomatopoeias that can be selected as the inquiry information is associated with a frequency range of the corresponding abnormal sound, a characteristic of the corresponding abnormal sound, and an onomatopoeia of another abnormal sound that is similar to the corresponding abnormal sound. Further, the table illustrated in FIG. 12 is created such that a plurality of generation places (for example, the “engine” and the “vehicle body”) in which the abnormal sound corresponding to the onomatopoeia is highly likely generated and the frequency range of the abnormal sound corresponding to the onomatopoeia in each of the plurality of generation places are associated with at least any one (in the example of FIG. 12, for example, “katakata” and “karakara”) of the plurality of onomatopoeias.

Further, in the table illustrated in FIG. 12, as the frequency range, the frequency range of the plurality of generation places from the minimum frequency (“0.5 kHz” of the “engine” in the example of FIG. 12) to the maximum frequency (“5 kHz” of the “vehicle body” in the example of FIG. 12) when the generation place of the abnormal sound is not designated (selected) by the worker, the owner, or the like (when the generation place is not known) is associated with the onomatopoeia associated with the plurality of generation places. The table of FIG. 12 is also updated by the server 20 at a timing when a new abnormal sound is proven to be generated in the vehicle V or on a regular basis based on the information acquired from the vehicles or the information that is on the new abnormal sound proven to be generated in the vehicle V and is sent from, for example, an automobile manufacturer (such as, a developer), a vehicle dealership, or a maintenance shop.

Figure 13:
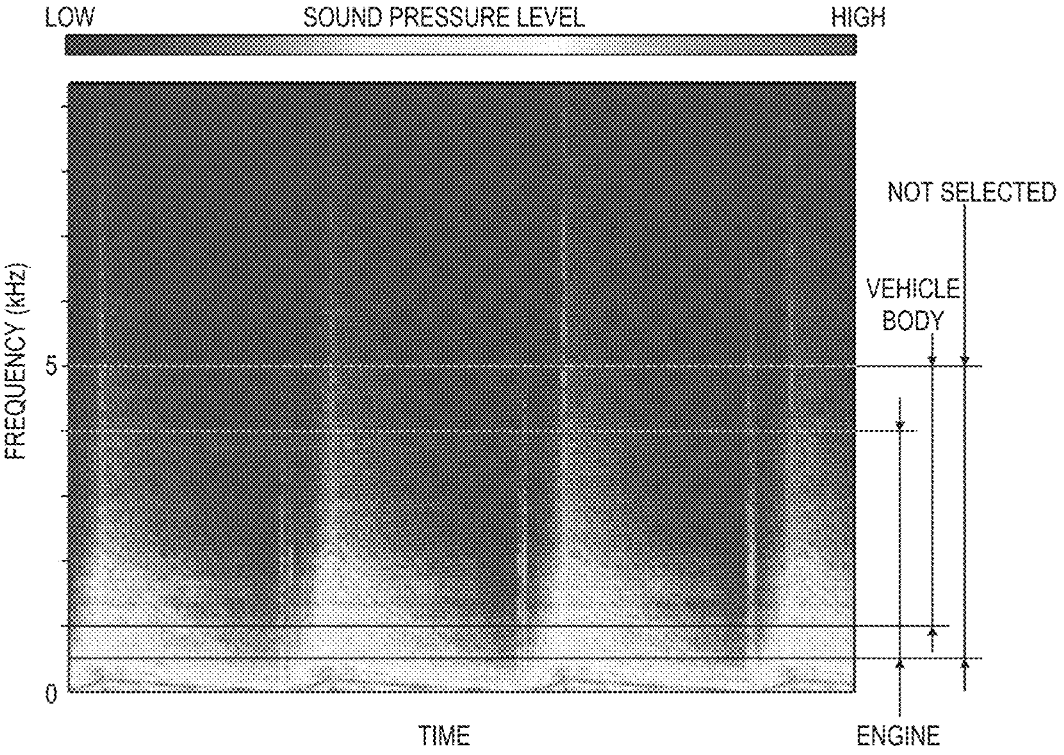
FIG. 13 is a descriptive diagram illustrating procedures for acquiring an inferred frequency range of the abnormal sound using the table of FIG. 12.

Then, when the inquiry information includes the generation place of the abnormal sound and at least one of the plurality of onomatopoeias is associated with the generation places and a plurality of frequency ranges, in step S152 of FIG. 3, the onomatopoeia and the frequency range corresponding to the generation place that are designated (selected) in the inquiry information from the table illustrated in FIG. 12 are acquired as the inferred frequency range of the abnormal sound generated in the vehicle V. In other words, when “katakata” is designated (selected) as the onomatopoeia and the “engine” is designated (selected) as the generation place by the worker, the owner, or the like, as can be seen from FIGS. 12 and 13, in step S152 of FIG. 3, a range from 0.5 kHz to 4 kHz is acquired as the inferred frequency range. Alternatively, when “katakata” is designated (selected) as the onomatopoeia and no generation place is designated (selected) by the worker, the owner, or the like, as can be seen from FIG. 13, in step S152 of FIG. 3, a range from 0.5 kHz to 5 kHz is acquired as the inferred frequency range.

As such, in the abnormal sound diagnosis system 1, it is possible to designate the generation place of the abnormal sound in addition to the onomatopoeia, and at least one of the plurality of onomatopoeias may be associated with the plurality of generation places and the plurality of frequency ranges. As such, it possible to further enhance the accuracy of the diagnosis result of the abnormal sound generated in the vehicle V by the abnormal sound diagnosis unit 21 of the server 20. Further, the table of FIG. 12 is updated by the server 20 over time. Therefore, with an onomatopoeia (an onomatopoeia having the “common” generation place) that has not been associated with the plurality of generation places at first, the plurality of generation places and the plurality of frequency ranges can be associated afterwards. As such, it possible to further enhance the accuracy of the diagnosis result of the abnormal sound by the abnormal sound diagnosis unit 21.

As described above, the abnormal sound diagnosis system that is one of the embodiments of the present disclosure is the abnormal sound diagnosis system 1 that diagnoses the abnormal sound generated in the object V, and includes the sound acquisition unit 14 that acquires the data of the sound generated from the object V, the inquiry information acquisition unit 13 that acquires the inquiry information on the abnormal sound generated in the object V, the arithmetic processing unit 16 that acquires the spectrogram indicating a relationship between the time, the frequency, and the sound pressure from the data of the sound, the extraction unit 17 that acquires the inferred frequency range of the abnormal sound generated in the object V based on the inquiry information acquired by the inquiry information acquisition unit 13 and extracts the range corresponding to the inferred frequency range of the spectrogram acquired by the arithmetic processing unit 16, and the diagnosis units 21 that diagnose the cause of the abnormal sound generated in the object V based on the range of the spectrogram extracted by the extraction unit 17.

The abnormal sound diagnosis system of the present disclosure acquires the spectrogram indicating the relationship between the time, the frequency, and the sound pressure from the data of the sound generated from the object, and acquires, based on the inquiry information acquired by the inquiry information acquisition unit, the inferred frequency range of the abnormal sound generated in the object. Further, the abnormal sound diagnosis system extracts the range corresponding to the inferred frequency range of the spectrogram, and diagnoses, based on the extracted range, the cause of the abnormal sound generated in the object. As such, by selecting the range of the spectrogram to be analyzed by the diagnosis unit on the system side based on the inquiry information, it is possible to suitably ensure the accuracy of the diagnosis result of the cause of the abnormal sound. Further, the user of the abnormal sound diagnosis system does not have to select the range of the spectrogram to be analyzed by the diagnosis unit by himself/herself. As a result, even the user with little experience in using the abnormal sound diagnosis system can easily obtain a highly accurate diagnosis result of the abnormal sound generated in the object.

Further, the abnormal sound diagnosis system 1 may include a storage device M that stores the onomatopoeia in association with the frequency range for each of the abnormal sounds generated in the object V. The inquiry information may include the onomatopoeia similar to the abnormal sound generated in the object V. The extraction unit 17 may acquire, as the inferred frequency range, the frequency range corresponding to the onomatopoeia included in the inquiry information from the information stored in the storage device M. As such, by selecting the onomatopoeia close to the abnormal sound generated in the object, the user of the abnormal sound diagnosis system or the owner or the like of the object can easily obtain the highly accurate diagnosis result.

Further, the inquiry information may include the generation place of the abnormal sound. The storage device M may store a plurality of generation places and the frequency range of the abnormal sound in each of the plurality of generation places in association with at least one of a plurality of the onomatopoeias. The extraction unit 17 may acquire, as the inferred frequency range, the frequency range corresponding to the onomatopoeia and the generation place included in the inquiry information from information stored in the storage device M. As such, it possible to further enhance the accuracy of the diagnosis result of the abnormal sound generated in the object by the diagnosis unit.

Further, the abnormal sound diagnosis system 1 may include the display unit 11 that displays the range corresponding to the inferred frequency range of the spectrogram extracted by the extraction unit 17, and the user may be allowed to select a desired range of the spectrogram displayed on the display unit 11. As such, the user of the abnormal sound diagnosis system can confirm the extraction result by the extraction unit from the spectrogram displayed on the display unit and further narrow down the analysis range. In addition, by confirming the extraction result by the extraction unit and the diagnosis result by the diagnosis unit, the user with little experience in using the abnormal sound diagnosis system can understand a method of efficiently selecting the spectrogram on the display unit.

Further, the diagnosis unit 21 may diagnose the cause of the abnormal sound based on the data of the sound acquired by the sound acquisition unit 14, the inquiry information acquired by the inquiry information acquisition unit 13, and the inferred frequency range or the range, selected by the user, from the range corresponding to the inferred frequency range of the spectrogram displayed on the display unit 11. As such, it is possible to accurately diagnose the cause of the abnormal sound.

Further, the diagnosis unit 21 may be constructed by the supervised learning such that the cause of the abnormal sound is diagnosed based on the given information. As such, it is possible to further enhance the accuracy of diagnosing the abnormal sound.

Further, the abnormal sound diagnosis system 1 may include the mobile terminal 10 including the inquiry information acquisition unit 13, the sound acquisition unit 14, the arithmetic processing unit 16, and the extraction unit 17, and the information processing device 20 including the diagnosis unit 21 and exchanging the information by the communication with the mobile terminal 10. As such, it is possible to easily acquire the data of the sound, and reduce the load on the mobile terminal to obtain a highly accurate diagnosis result by the information processing device.

Further, the abnormal sound diagnosis system that is another embodiment of the present disclosure is the abnormal sound diagnosis system 1 that diagnoses the abnormal sound generated in the object V, and includes the sound acquisition unit 14 that acquires the data of the sound generated from the object V, the inquiry information acquisition unit 13 that acquires the inquiry information on the abnormal sound generated in the object V, the arithmetic processing unit 16 that acquires the relationship between at least the time and the sound pressure from the data of the sound, the extraction unit 17 that acquires, based on the inquiry information acquired by the inquiry information acquisition unit 13, the generation time period in which the abnormal sound is generated in the object V and extracts the range corresponding to the generation time period of the relationship between the time and the sound pressure acquired by the arithmetic processing unit 16, and the diagnosis unit 21 that diagnoses, based on the range of the relationship between the time and the sound pressure, extracted by the extraction unit 17, the cause of the abnormal sound generated in the object V.

The abnormal sound diagnosis system of the present disclosure acquires the relationship between at least the time and the sound pressure from the data of the sound generated from the object, and acquires, based on the inquiry information acquired by the inquiry information acquisition unit, the generation time period in which the abnormal sound is generated in the object. Further, the abnormal sound diagnosis system extracts the range corresponding to the generation time period of the relationship between time and the sound pressure, and diagnoses, based on the extracted range, the cause of the abnormal sound generated in the object. As such, by selecting, on the system side, based on the inquiry information, the range of the relationship between the time and the sound pressure to be analyzed by the diagnosis unit, it is possible to suitably ensure the accuracy of the diagnosis result of the cause of the abnormal sound. Further, the user of the abnormal sound diagnosis system does not have to select the range of the relationship between the time and the sound pressure to be analyzed by the diagnosis unit by himself/herself. As a result, even the user with little experience in using the abnormal sound diagnosis system can easily obtain a highly accurate diagnosis result of the abnormal sound generated in the object.

Further, the abnormal sound diagnosis system 1 may include the vehicle state acquisition unit 15 that acquires the state of the object V in synchronization with the acquisition of the data of the sound by the sound acquisition unit 14. The inquiry information may include the state of the object V when the abnormal sound is generated. The extraction unit 17 may acquire, as the generation time period, the time period, in which the state of the object V acquired by the vehicle state acquisition unit 15 matches the state of the object V included in the inquiry information, from the acquisition time range of the data of the sound. As such, since the generation time period can be appropriately acquired, it is possible to further enhance the accuracy of the diagnosis result of the cause of the abnormal sound.

Further, the arithmetic processing unit 16 may acquire the spectrogram, indicating the relationship between the time, the frequency, and the sound pressure, from the data of the sound. The extraction unit 17 may extract the frequency where the sound pressure is changed by a value equal to or higher than the predetermined value between the time period in which the state of the object V that is acquired by the vehicle state acquisition unit 15 matches the state of the object V that is included in the inquiry information and a time period in which the state of the object V that is acquired by the vehicle state acquisition unit 15 does not match the state of the object V that is included in the inquiry information. As such, it is possible to appropriately narrow down, based on the inquiry information, the frequency range of the spectrogram to be analyzed by the diagnosis unit.

Further, the object V may be the vehicle. The state of the object V may include at least one of the physical quantity that is changed when the vehicle travels and the driving state of the vehicle. As such, it is possible to accurately diagnose the cause of the abnormal sound generated in the vehicle.

Further, the abnormal sound diagnosis system 1 may include the display unit 11 that displays the range, corresponding to the generation time period of the relationship between the time and the sound pressure, extracted by the extraction unit 17, and allow the user to select the desired range of the relationship between the time and the sound pressure displayed on the display unit 11. As such, the user of the abnormal sound diagnosis system can confirm the extraction result by the extraction unit from the relationship between the time and the sound pressure displayed on the display unit, and further narrow down the range. In addition, by confirming the extraction result by the extraction unit and the diagnosis result by the diagnosis unit, the user with little experience in using the abnormal sound diagnosis system can understand the method of efficiently selecting the relationship between the time and the sound pressure on the display unit.

Further, the diagnosis unit 21 may diagnose the cause of the abnormal sound based on the data of the sound acquired by the sound acquisition unit 14, the inquiry information acquired by the inquiry information acquisition unit 13, and the generation time period or the selected range, selected by the user, from the range corresponding to the generation time period of the relationship between the time and the sound pressure displayed on the display unit 11. As such, it is possible to accurately diagnose the cause of the abnormal sound.

Further, the diagnosis unit 21 may be constructed by the supervised learning such that the cause of the abnormal sound is diagnosed based on the given information. As such, it is possible to further enhance the accuracy of diagnosing the abnormal sound.

Further, the abnormal sound diagnosis system 1 may include the mobile terminal 10 including the inquiry information acquisition unit 13, the sound acquisition unit 14, the arithmetic processing unit 16, and the extraction unit 17, and the information processing device 20 including the diagnosis unit 21 and exchanging the information by the communication with the mobile terminal 10. As such, it is possible to easily acquire the data of the sound, and reduce the load on the mobile terminal to obtain a highly accurate diagnosis result by the information processing device.

Therefore, it is needless to say that the present disclosure is not limited to the above embodiment, and can be variously modified within the scope of the present disclosure. Further, the above embodiment is merely one specific form of the disclosure described in the SUMMARY, and thus is not limited to the elements the disclosure described in the SUMMARY.

The present disclosure is extremely useful for diagnosing an abnormal sound generated in an object, such as a vehicle.

What is claimed is:

1. An abnormal sound diagnosis system configured to diagnose an abnormal sound generated in a vehicle configured for mobility, the abnormal sound diagnosis system comprising:

a processor configured to:

acquire data of a sound generated from the vehicle, the data of the sound generated from the vehicle is acquired from a microphone configured to transform sound pressure into the data of the sound;

acquire inquiry information regarding the abnormal sound generated in the vehicle;

acquire a spectrogram indicating a relationship among a time, a frequency, and the sound pressure from the data of the sound;

acquire, based on the inquiry information, an inferred frequency range of the abnormal sound generated in the vehicle;

extract an extracted range corresponding to the inferred frequency range of the spectrogram; and diagnose, based on the extracted range of the spectrogram, a cause of the abnormal sound generated in the vehicle, by a neural network constructed by a supervised learning such that the cause of the abnormal sound generated in the vehicle or a part that is a source of the abnormal sound is diagnosed, based on the inquiry information acquired.

2. The abnormal sound diagnosis system according to claim 1, further comprising a server having a storage device that stores an onomatopoeia in association with a frequency range for each of abnormal sounds generated in the vehicle, wherein:

the inquiry information includes information on the onomatopoeia similar to the abnormal sound generated in the vehicle; and the processor is further configured to acquire, as the inferred frequency range, the frequency range corresponding to the onomatopoeia in the inquiry information from information stored in the storage device.

3. The abnormal sound diagnosis system according to claim 2, wherein:

the inquiry information includes a generation place of the abnormal sound;

the storage device stores at least one of onomatopoeias in association with a plurality of generation places and the frequency range of the abnormal sound in each of the generation places; and the processor is further configured to acquire, as the inferred frequency range, the frequency range corresponding to the onomatopoeia and the generation place in the inquiry information from the information stored in the storage device.

4. The abnormal sound diagnosis system according to claim 1, further comprising a display configured to display the extracted range extracted by the processor, wherein a selection is allowed to a user about a desired range of the spectrogram displayed on the display.

5. The abnormal sound diagnosis system according to claim 4, wherein:

the processor is further configured to diagnose the cause of the abnormal sound based on the data of the sound, the inquiry information, and the inferred frequency range or a selected range; and the selected range is a range selected by the user from the extracted range displayed on the display.

6. The abnormal sound diagnosis system according to claim 1, wherein the processor is further configured to:

extract a second frequency where the sound pressure is changed by a value equal to or higher than a predetermined value between a first time period and a second time period, wherein the frequency extracted where the sound pressure is changed by the value equal to or higher than the predetermined value between the first time period and the second time period is determined in advance for each of a plurality of frequencies in the spectrogram between a generation time period in which a physical quantity of a vehicle state information matches a physical quantity included in the inquiry information and a time period in which the physical quantity of the vehicle state information does not match the physical quantity included in the inquiry information.

7. An abnormal sound diagnosis system configured to diagnose an abnormal sound generated in an vehicle configured for mobility, the abnormal sound diagnosis system comprising:

a processor configured to:

acquire data of a sound generated from the vehicle, the data of the sound generated from the vehicle is acquired from a microphone configured to transform sound pressure into the data of the sound;

acquire inquiry information on the abnormal sound generated in the vehicle;

acquire a relationship between a time and the sound pressure from the data of the sound;

acquire, based on the inquiry information, a generation time period in which the abnormal sound is generated in the vehicle;

extract an extracted range corresponding to the generation time period of the relationship between the time and the sound pressure; and diagnose, based on the extracted range of the relationship between the time and the sound pressure, a cause of the abnormal sound generated in the vehicle, by a neural network constructed by a supervised learning such that the cause of the abnormal sound generated in the vehicle or a part that is a source of the abnormal sound is diagnosed, based on the inquiry information acquired.

8. The abnormal sound diagnosis system according to claim 7, wherein the processor is further configured to:

acquire a state of the vehicle in synchronization with acquiring the data of the sound, wherein:

the inquiry information includes information on the state of the vehicle when the abnormal sound is generated; and acquire, as the generation time period, a time period in which the state of the vehicle matches the state of the vehicle in the inquiry information among an acquisition time range of the data of the sound.

9. The abnormal sound diagnosis system according to claim 8, wherein:

the processor is further configured to:

acquire a spectrogram indicating a relationship among the time, a frequency, and the sound pressure from the data of the sound;

extract a second frequency where the sound pressure is changed by a value equal to or higher than a predetermined value between a first time period and a second time period;

the first time period is a time period in which the state of the vehicle matches the state of the vehicle in the inquiry information; and the second time period is a time period in which the state of the vehicle does not match the state of the vehicle in the inquiry information.

10. The abnormal sound diagnosis system according to claim 9, wherein the second frequency extracted where the sound pressure is changed by the value equal to or higher than the predetermined value between the first time period and the second time period is determined in advance for each of a plurality of frequencies in the spectrogram between the generation time period in which a physical quantity of a vehicle state information matches a physical quantity included in the inquiry information and a time period in which the physical quantity of the vehicle state information does not match the physical quantity included in the inquiry information.

11. The abnormal sound diagnosis system according to claim 8, wherein:

the state of the vehicle includes at least one of a driving state of the vehicle and a physical quantity changed when the vehicle travels.

12. The abnormal sound diagnosis system according to claim 11, wherein the at least one of the driving state of the vehicle is selected from a starting, an idling, a stopping, an accelerating, a constant speed traveling, a decelerating, a braking, a reversing, a turning, a motor traveling, and a hybrid traveling of the vehicle.

13. The abnormal sound diagnosis system according to claim 11, wherein the physical quantity is a vehicle speed of the vehicle, the driving state of the vehicle, a warm-up effect in the vehicle having an engine mounted thereon, and a traveling environment information of the vehicle.

14. The abnormal sound diagnosis system according to claim 7, further comprising a display configured to display the extracted range, wherein a selection is allowed to a user about a desired range of the relationship between the time and the sound pressure displayed on the display.

15. The abnormal sound diagnosis system according to claim 14, wherein:

the processor is further configured to diagnose the cause of the abnormal sound based on the data of the sound, the inquiry information, and the generation time period or a time range; and the time range is a range selected by the user from the extracted range displayed on the display.

16. An abnormal sound diagnosis system comprising:

a mobile terminal having a processor configured to:

acquire data of a sound generated from a vehicle configured for mobility, the data of the sound generated from the vehicle is acquired from a microphone configured to transform sound pressure into the data of the sound, acquire inquiry information on an abnormal sound generated in the vehicle, acquire a spectrogram indicating a relationship among a time, a frequency, and the sound pressure from the data of the sound, acquire, based on the inquiry information, an inferred frequency range of the abnormal sound generated in the vehicle, and extract an extracted range corresponding to the inferred frequency range of the spectrogram; and a server configured to diagnose, based on the extracted range of the spectrogram, a cause of the abnormal sound generated in the vehicle, by a neural network constructed by a supervised learning such that the cause of the abnormal sound generated in the vehicle or a part that is a source of the abnormal sound is diagnosed, based on the inquiry information acquired.

17. The abnormal sound diagnosis system according to claim 16, wherein:

the server includes a storage device that stores an onomatopoeia in association with a frequency range for each of abnormal sounds generated in the vehicle;

the inquiry information includes information on the onomatopoeia similar to the abnormal sound generated in the vehicle; and the mobile terminal is configured to acquire, as the inferred frequency range, the frequency range corresponding to the onomatopoeia in the inquiry information from information stored in the storage device.

18. The abnormal sound diagnosis system according to claim 16, wherein the processor is further configured to:

extract a second frequency where the sound pressure is changed by a value equal to or higher than a predetermined value between a first time period and a second time period, wherein the frequency extracted where the sound pressure is changed by the value equal to or higher than the predetermined value between the first time period and the second time period is determined in advance for each of a plurality of frequencies in the spectrogram between a generation time period in which a physical quantity of a vehicle state information matches a physical quantity included in the inquiry information and a time period in which the physical quantity of the vehicle state information does not match the physical quantity included in the inquiry information.

* * * * *